US006980295B2

(12) United States Patent
Lerner

(10) Patent No.: US 6,980,295 B2
(45) Date of Patent: *Dec. 27, 2005

(54) COMPACT CATADIOPTRIC IMAGING SPECTROMETER UTILIZING REFLECTIVE GRATING

(75) Inventor: Scott A. Lerner, Livermore, CA (US)

(73) Assignee: The Regents of the University of California, Oakland, CA (US)

(*) Notice: Subject to any disclaimer, the term of this patent is extended or adjusted under 35 U.S.C. 154(b) by 147 days.

This patent is subject to a terminal disclaimer.

(21) Appl. No.: 10/680,788

(22) Filed: Oct. 6, 2003

(65) Prior Publication Data

US 2005/0259253 A1    Nov. 24, 2005

(51) Int. Cl.[7] ................................. G01J 3/28
(52) U.S. Cl. ..................... 356/328; 250/339.07
(58) Field of Search ................. 356/305, 326, 356/328, 331, 332, 333, 334; 250/339.07

(56) References Cited

U.S. PATENT DOCUMENTS

| | | |
|---|---|---|
| 5,127,728 A | 7/1992 | Warren et al. |
| 5,717,487 A | 2/1998 | Davies |
| 5,781,290 A | 7/1998 | Bittner et al. |
| 5,880,834 A | 3/1999 | Chrisp |
| 6,016,220 A | 1/2000 | Cook |
| 6,078,048 A | 6/2000 | Stevens et al. |
| 6,100,974 A | 8/2000 | Reininger |
| 6,122,051 A | 9/2000 | Ansley et al. |
| 6,266,140 B1 | 7/2001 | Xiang et al. |
| 6,388,799 B1 | 5/2002 | Arnone et al. |
| 6,538,737 B2 | 3/2003 | Sandstrom et al. |
| 2002/0101587 A1 | 8/2002 | Wilson et al. |
| 2002/0135770 A1 | 9/2002 | Lewis et al. |
| 2003/0016355 A1 | 1/2003 | Koike et al. |

*Primary Examiner*—F. L. Evans
(74) *Attorney, Agent, or Firm*—Eddie E. Scott; Alan H. Thompson

(57) ABSTRACT

An imaging spectrometer apparatus comprising an entrance slit for directing light, a light means for receiving the light and directing the light, a grating that receives the light from the light means and defracts the light back onto the light means which focuses the light, and a detector that receives the focused light. In one embodiment the light means is a rotationally symmetric ZNSE aspheric lens. In another embodiment the light means comprises two ZNSE aspheric lenses that are coaxial. In another embodiment the light means comprises an aspheric mirror and a ZNSE aspheric lens.

15 Claims, 5 Drawing Sheets

COMPACT CATADIOPTRIC IMAGING SPECTROMETER UTILIZING REFLECTIVE GRATING

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to a spectrometer and more particularly to a compact reflective imaging spectrometer.

2. State of Technology

U.S. Pat. No. 5,717,487 issued Feb. 10, 1998 to Donald W. Davies, and assigned to TRW Inc., provides the following state of technology information, "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter. In past scientific work, the spectral analyses of a host of known elements, molecules, materials, living plants, gases and the like, has been compiled into a library. That library enables objects and things to be identified solely by the spectrometric analysis of the light reflected therefrom. Thus, as example, by examining the spectral content of light reflected from the distant planets, astronomers identified the constituent elements, such as iron, forming those planets; by examining the spectral content of Gases emitted by factory smokestacks, scientists determine if pollutants are being emitted in violation of law or regulation; by examining the spectral content of land, the environmental engineer is able to determine the botanical fertility of a region and its mineral content, and, with subsequent observations, to determine the change in the environment with time; and by examining the spectral content of light reflected in multiple scans over a geographic region, military personnel identify camouflaged military equipment, separate from plant life, in that geographic region. The foregoing represent but a small number of the many known uses of this useful scientific tool."

U.S. Patent Application No. 20020135770 published Sep. 26, 2003 by E. Neil Lewis and Kenneth S. Haber for a Hybrid Imaging Spectrometer, provides the following state of technology information, "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 issued Jun. 20, 2000 to Charles G. Stevens and Norman L. Thomas for an immersion echelle spectrograph, assigned to The Regents of the University of California, provides the following state of technology information, "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 cm.sup.−1. This provides for maximum sensitivity to simple molecules with the narrowest spectral features, allows for corrections for the presence of atmospheric constituents, maximizing species selectivity, and provides greater opportunity to detect unanticipated species. Fourier transform spectrometers, such as Michelson interferometers, have long been the instrument of choice for high resolution spectroscopy in the infrared spectral region. This derives from its advantage in light gathering power and spectral multiplexing over conventional dispersive spectrometers. For remote sensing applications and for those applications in hostile environments, the Fourier transform spectrometer, such as the Michelson interferometer, is ill suited for these applications due to the requirements for keeping a moving mirror aligned to better than a wavelength over the mirror surface. Furthermore, this spectrometer collects amplitude variations over time that are then transformed into frequency information for spectral generation. Consequently, this approach requires stable radiation sources and has difficulty dealing with rapidly changing reflectors or emissions as generally encountered in remote field observations, particularly from moving observation platforms. Furthermore, under conditions where the noise terms are dominated by the light source itself, the sensitivity of the instrument is limited by the so-called multiplex disadvantage."

U.S. Pat. No. 5,880,834 issued Mar. 9, 1999 to Michael Peter Chrisp for a convex diffraction grating imaging spectrometer, assigned to The United States of America as represented by the Administrator of the National Aeronautics and Space Administration, provides the following state of technology information, "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an imaging spectrometer apparatus, comprising an entrance slit for directing light, a light means for receiving the light and directing the light, a grating that receives the light from the light means and defracts the light back onto the light means which focuses the light, and a detector that receives the focused light. Small size for an imaging spectrometer is extremely important because it determines the requirements for the cryogenic cooling. For example, if the spectrometer is small it can fly in a small UAV. Also, if the spectrometer is small it is person portable. The imaging spectrometer of the present invention has a front and a back and the entrance slit, the grating, the light means, and the detector fit within an envelope. In one embodiment the light means is a rotationally symmetric ZNSE aspheric lens. In another embodiment the light means comprises two ZNSE aspheric lenses that are coaxial. In another embodiment the light means comprises an aspheric mirror and a ZNSE aspheric lens. Although the lens material is ZNSE in the design other materials such as germanium are suitable.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
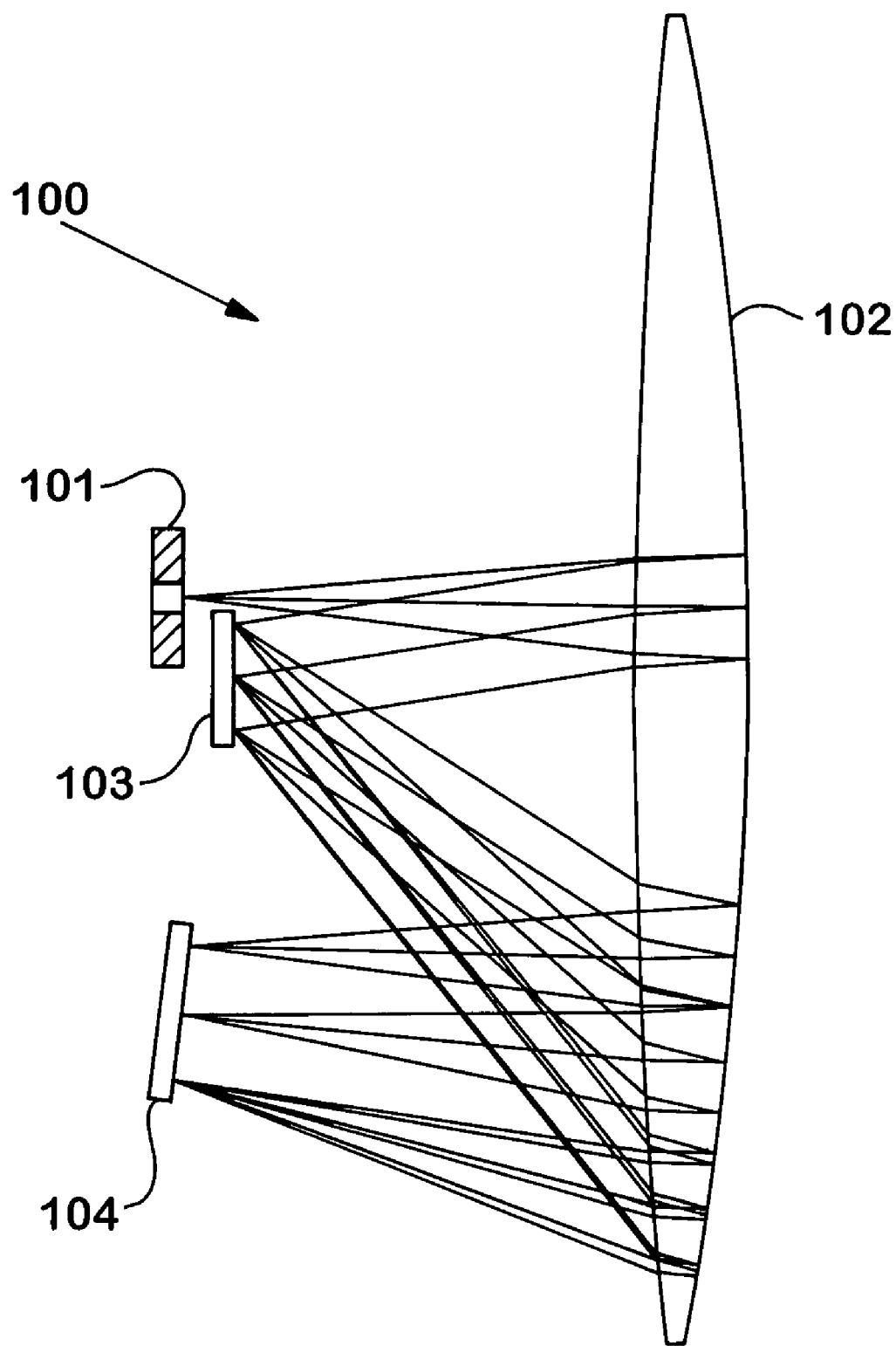
FIG. 1 is a raytrace illustrating an embodiment of a compact imaging spectrometer constructed in accordance with the present invention.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Small size for an imaging spectrometer is extremely important because it determines the requirements for the cryogenic cooling. For example, if the spectrometer is small it can fly in a small UAV. Also, if the spectrometer is small it is person portable. Referring to FIG. 1 of the drawings, an embodiment of a compact imaging spectrometer constructed in accordance with the present invention is illustrated. This embodiment of the present invention is designated generally by the reference numeral 100.

FIG. 1 is a raytrace for the imaging spectrometer 100. The structural elements of the compact imaging spectrometer 100 include an entrance slit 101, a rotationally symmetric ZNSE aspheric lens 102, a germanium grating 103, and a 2D detector array 104. The imaging spectrometer 100 has a size envelope that is smaller than spectrometers currently in use. The entrance slit 101, rotationally symmetric ZNSE aspheric lens 102, germanium grating 103, and 2D detector array 104 fit within the envelope. The envelope is 4.5 cm by 5.6 cm by 2.2 cm or smaller. As shown in FIG. 1, the X axis is 4.5 cm and the Y axis is 5.6 cm.

The imaging spectrometer 100 provides a compact imaging spectrometer based on catadioptric lenses and a diffraction grating. The rotationally symmetric ZNSE aspheric lens 102 in the compact imaging spectrometer 100 consist of rotationally symmetric surfaces. A catadioptric lens is a compound lens in which both a mirror(s) and lenses are used to form an image. The germanium grating 103 is a flat reflective grating with 45 lines/mm.

As shown in FIG. 1, light goes from the entrance slit 101 to the rotationally symmetric ZNSE aspheric lens 102. The rotationally symmetric ZNSE aspheric lens 102 refracts the light back to the germanium grating 103. The rotationally symmetric ZNSE aspheric lens 102 is ZNSE allowing for transmission of visible light. The diffracted order then propagates back to the lens 102, which focuses the light onto the 2D detector array 104.

The cold stop in the compact imaging spectrometer 100 is at the germanium grating 103. This ensures that the warm back radiation from outside the spectrometer entrance slit 101 does not reach the detector array 104. This would cause and unacceptable degradation in the signal to noise ratio. The geometry of the compact imaging spectrometer 100 allows a transmissive cold stop to be used ahead of the grating, for even better thermal background reduction, but this also increases the grating sizes.

Figure 2:
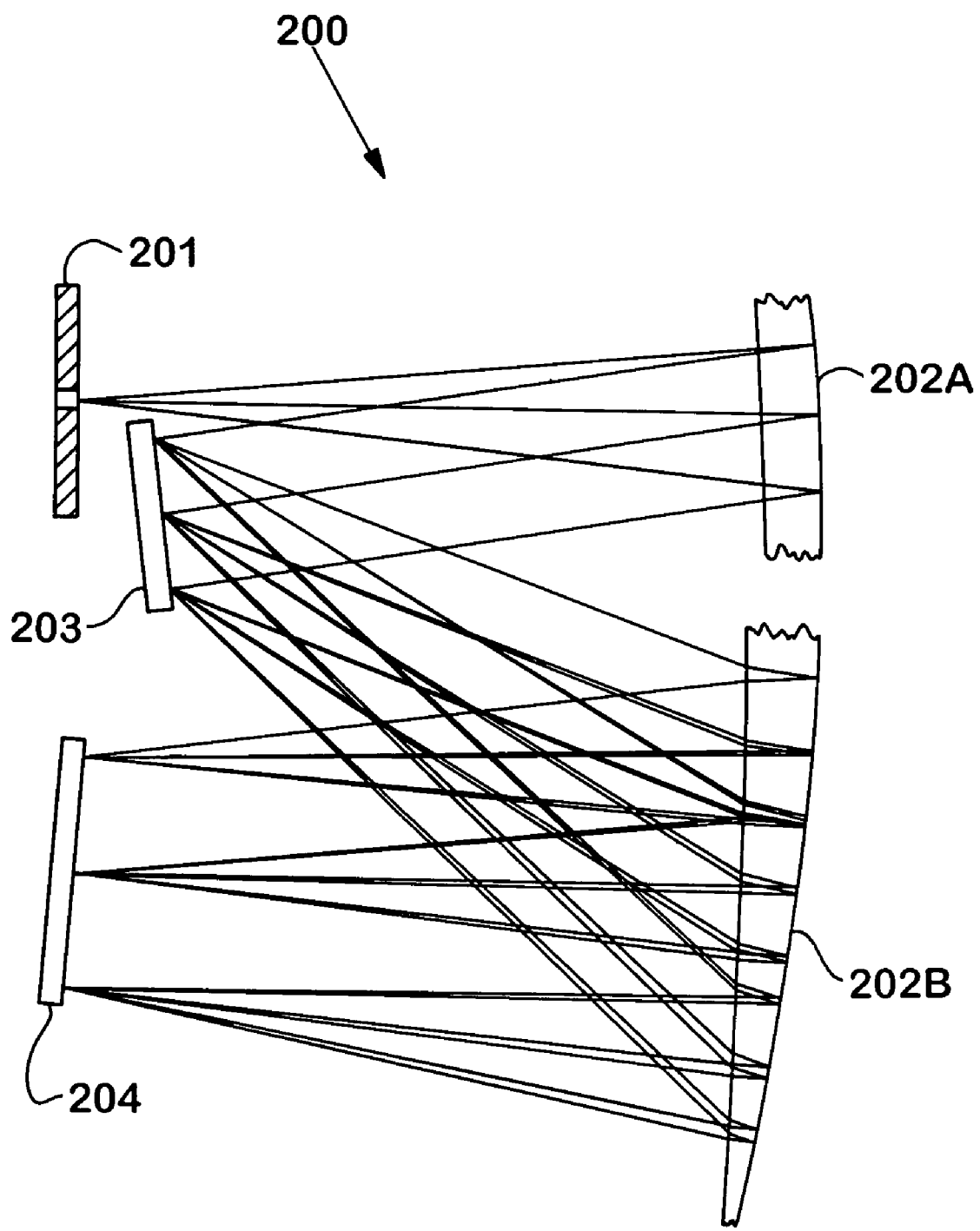
FIG. 2 is a raytrace illustrating another embodiment of a compact imaging spectrometer constructed in accordance with the present invention.

Referring now to FIG. 2 of the drawings, another embodiment of a compact imaging spectrometer constructed in accordance with the present invention is illustrated. This embodiment of the present invention is designated generally by the reference numeral 200. FIG. 2 is a raytrace for the imaging spectrometer 200.

The structural elements of the compact imaging spectrometer 200 include an entrance slit 201, ZNSE aspheric lenses 202A and 202B that are coaxial, a germanium grating 203, and a 2D detector array 204. The imaging spectrometer 200 has a size envelope that is smaller than spectrometers currently in use. The entrance slit 201, ZNSE aspheric lenses 202A and 202B, germanium grating 203, and 2D detector array 204 fit within the envelope. The envelope is 3.5 cm by 3.3 cm by 2.2 cm or smaller. As shown in FIG. 2, the X axis is 3.5 cm and the Y axis is 3.3 cm.

The imaging spectrometer 200 provides a compact imaging spectrometer based on catadioptric lenses and a diffraction grating. The ZNSE aspheric lenses 202A and 202B in the compact imaging spectrometer 200 consist of rotationally symmetric surfaces. A catadioptric lens is a compound lens in which both a mirror(s) and lenses are used to form an image. The germanium grating 203 is a flat reflective grating with 54 lines/mm. The germanium grating 203 is tilted.

As shown in FIG. 2, light goes from the entrance slit 201 to the ZNSE aspheric lens 202A. The ZNSE aspheric lens 202A refracts the light back to the germanium grating 203. The ZNSE aspheric lens 202A ZNSE allowing for transmission of visible light. The diffracted order then propagates back to the ZNSE aspheric lens 202B, which focuses the light onto the 2D detector array 204.

The cold stop in the compact imaging spectrometer 200 is at the germanium grating 203. This ensures that the warm back radiation from outside the spectrometer entrance slit 201 does not reach the detector array 204. This would cause and unacceptable degradation in the signal to noise ratio. The geometry of the compact imaging spectrometer 200 allows a transmissive cold stop to be used ahead of the grating, for even better thermal background reduction, but this also increases the grating sizes.

Figure 3:
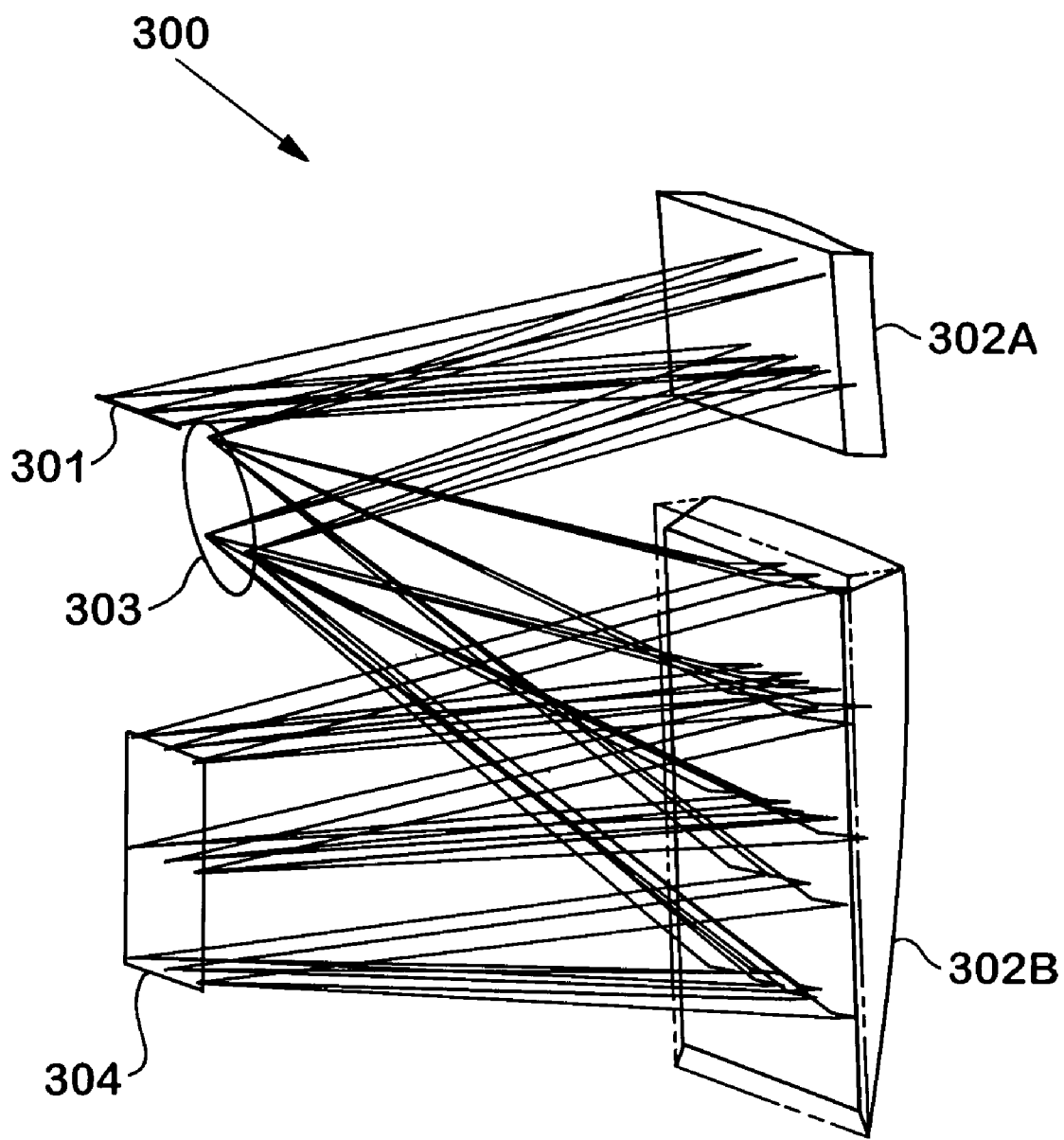
FIG. 3 is a perspective view of the raytrace of the compact imaging spectrometer shown in FIG. 2.

Referring now to FIG. 3 of the drawings, another embodiment of a compact imaging spectrometer constructed in accordance with the present invention is illustrated. This embodiment of the present invention is designated generally by the reference numeral 300. FIG. 3 is a perspective view of the raytrace illustrating an embodiment of a compact imaging spectrometer 200 constructed in accordance with the present invention shown in FIG. 2.

The structural elements of the compact imaging spectrometer 200 include an entrance slit 201, ZNSE aspheric lenses 202A and 202B that are coaxial, a germanium grating 203, and a 2D detector array 204. Light goes from the entrance slit 201 to the ZNSE aspheric lens 202A. The ZNSE aspheric lens 202A refracts the light back to the germanium grating 203. The ZNSE aspheric lens 202A ZNSE allowing for transmission of visible light. The diffracted order then propagates back to the ZNSE aspheric lens 202B, which focuses the light onto the 2D detector array 204.

The imaging spectrometer 200 has a size envelope that is smaller than spectrometers currently in use. The entrance slit 201, ZNSE aspheric lenses 202A and 202B, germanium grating 203, and 2D detector array 204 fit within the envelope. The envelope is 3.5 cm by 3.3 cm by 2.2 cm or smaller. As shown in FIG. 2, the X axis is 3.5 cm and the Y axis is 3.3 cm.

The imaging spectrometer 200 provides a compact imaging spectrometer based on catadioptric lenses and a diffraction grating. The ZNSE aspheric lenses 202A and 202B in the compact imaging spectrometer 200 consist of rotationally symmetric surfaces. A catadioptric lens is a compound lens in which both a mirror(s) and lenses are used to form an image. The germanium grating 203 is a flat reflective grating with 54 lines/mm. The germanium grating 203 is tilted.

The cold stop in the compact imaging spectrometer 200 is at the germanium grating 203. This ensures that the warm back radiation from outside the spectrometer entrance slit 201 does not reach the detector array 204. This would cause and unacceptable degradation in the signal to noise ratio. The geometry of the compact imaging spectrometer 200 allows a transmissive cold stop to be used ahead of the grating, for even better thermal background reduction, but this also increases the grating sizes.

Figure 4:
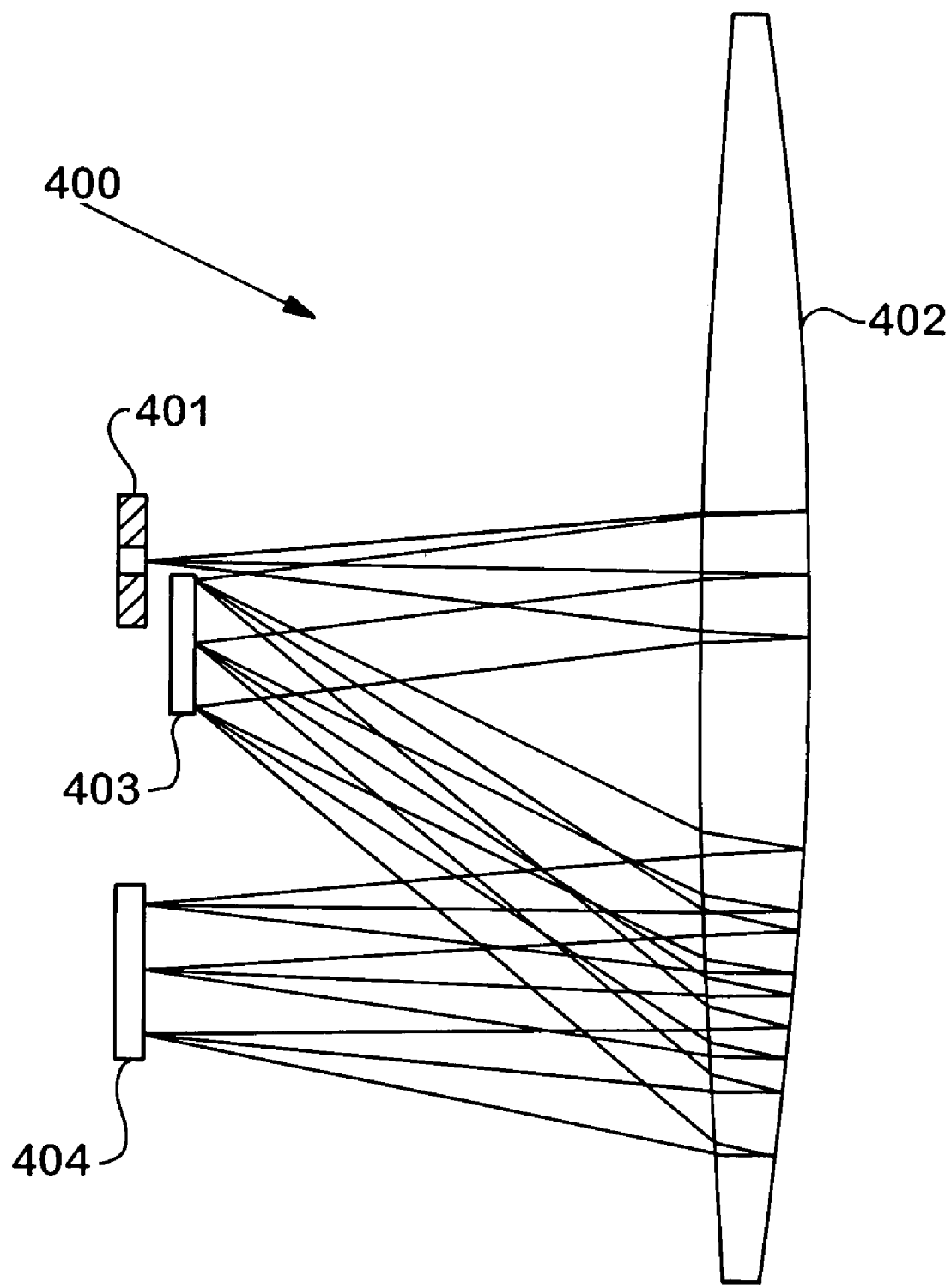
FIG. 4 is a raytrace illustrating another embodiment of a compact imaging spectrometer constructed in accordance with the present invention.

Referring now to FIG. 4 of the drawings, another embodiment of a compact imaging spectrometer constructed in accordance with the present invention is illustrated. This embodiment of the present invention is designated generally by the reference numeral 400. FIG. 4 is a raytrace for the imaging spectrometer 400.

The structural elements of the compact imaging spectrometer 400 include an entrance slit 401, a rotationally symmetric ZNSE aspheric lens 402, a germanium grating 403, and a 2D detector array 404. The imaging spectrometer 400 has a size envelope that is smaller than spectrometers currently in use. The entrance slit 401, rotationally symmetric ZNSE aspheric lens 402, germanium grating 403, and 2D detector array 404 fit within the envelope. The envelope is 5.5 cm by 5.0 cm by 2.2 cm or smaller. As shown in FIG. 4, the X axis is 5.5 cm and the Y axis is 5.0 cm.

The imaging spectrometer 400 provides a compact imaging spectrometer based on catadioptric lenses and a diffraction grating. The rotationally symmetric ZNSE aspheric lens 402 in the compact imaging spectrometer 400 consist of rotationally symmetric surfaces. A catadioptric lens is a compound lens in which both a mirror(s) and lenses are used to form an image. The germanium grating 403 is a flat reflective grating with 36 lines/mm.

As shown in FIG. 4, light goes from the entrance slit 401 to the rotationally symmetric ZNSE aspheric lens 402. The rotationally symmetric ZNSE aspheric lens 402 refracts the light back to the germanium grating 403. The rotationally symmetric ZNSE aspheric lens 402 is ZNSE allowing for transmission of visible light. The diffracted order then propagates back to the lens 402, which focuses the light onto the 2D detector array 404.

The cold stop in the compact imaging spectrometer 400 is at the germanium grating 403. This ensures that the warm back radiation from outside the spectrometer entrance slit 401 does not reach the detector array 404. This would cause and unacceptable degradation in the signal to noise ratio. The geometry of the compact imaging spectrometer 400 allows a transmissive cold stop to be used ahead of the grating, for even better thermal background reduction, but this also increases the grating sizes.

Figure 5:
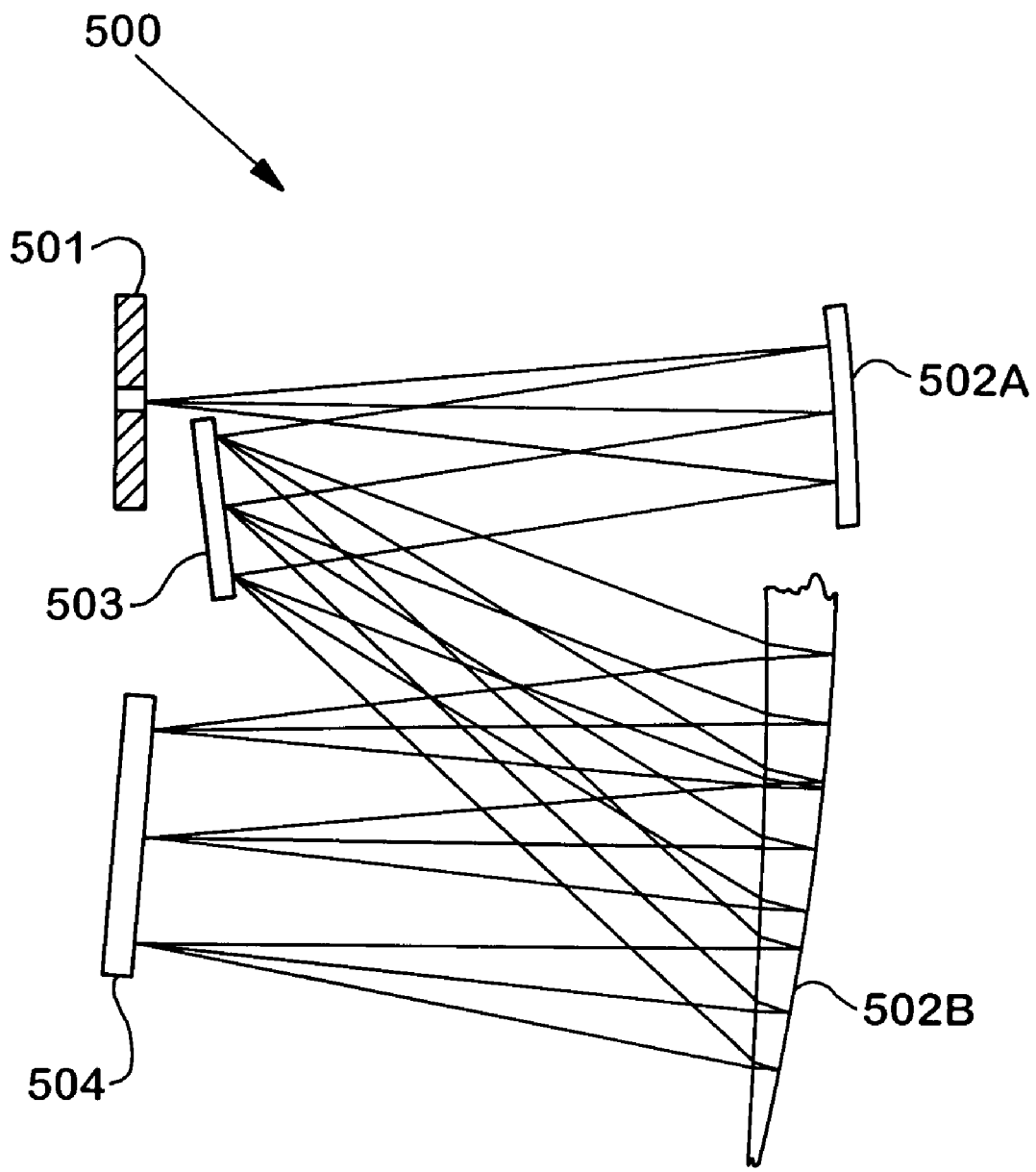
FIG. 5 is a raytrace illustrating yet another embodiment of a compact imaging spectrometer constructed in accordance with the present invention.

Referring now to FIG. 5 of the drawings, another embodiment of a compact imaging spectrometer constructed in accordance with the present invention is illustrated. This embodiment of the present invention is designated generally by the reference numeral 500. FIG. 5 is a raytrace for the imaging spectrometer 500.

The structural elements of the compact imaging spectrometer 500 include an entrance slit 501, lenses 502A and 502B, a germanium grating 503, and a 2D detector array 504. The imaging spectrometer 500 has a size envelope that is smaller than spectrometers currently in use. The entrance slit 501, lenses 502A and 502B, germanium grating 503, and 2D detector array 504 fit within the envelope. The envelope is 3.5 cm by 3.5 cm by 2.2 cm or smaller.

The imaging spectrometer 500 provides a compact imaging spectrometer based on two lenses and a diffraction grating. The lenses 502A and 502B in the compact imaging spectrometer 500 consist of an aspheric mirror 502A and a ZNSE aspheric lens 502B. The germanium grating 503 is a flat reflective grating with 54 lines/mm. The germanium grating 503 is tilted.

As shown in FIG. 5, light goes from the entrance slit 501 to the aspheric mirror 502A. The aspheric mirror 502A refracts the light back to the germanium grating 503. The diffracted order then propagates to the ZNSE aspheric lens 502B, which focuses the light onto the 2D detector array 504.

The cold stop in the compact imaging spectrometer 500 is at the germanium grating 503. This ensures that the warm back radiation from outside the spectrometer entrance slit 501 does not reach the detector array 504. This would cause and unacceptable degradation in the signal to noise ratio. The geometry of the compact imaging spectrometer 500 allows a transmissive cold stop to be used ahead of the grating, for even better thermal background reduction, but this also increases the grating sizes.

The present invention provides an imaging spectrometer apparatus, comprising an entrance slit for directing light, a light means for receiving the light and directing the light, a grating that receives the light from the light means and defracts the light back onto the light means which focuses the light, and a detector that receives the focused light. In one embodiment the light means is a rotationally symmetric ZNSE aspheric lens. In another embodiment the light means comprises two ZNSE aspheric lenses that are coaxial. In another embodiment the light means comprises an aspheric mirror and a ZNSE aspheric lens. Some of the structural elements of the imaging spectrometer of the present invention will be described in greater detail.

THE ENTRANCE SLIT—Light enters the imaging spectrometer through the entrance slit (101, 201, 401, and 501). The spectral slit curvature has been corrected to less than one tenth of a pixel over the detector arrays. This is the curvature of slit image on the detector at a single wavelengths, which is a common problem with imaging spectrometer designs. The spatial mapping distortion has also been corrected to less than one tenth off a pixel over the full wavelength range. This means that the spectrum from a single point in the entrance slit will not wander from the center of a row pixels by less than ±2 microns. Correcting the spectral slit curvature and the spatial mapping distortion with wavelength to less than one tenth of a pixel ensures that the images do not have to be resampled to correct for these effects.

LIGHT MEANS—The light means for receiving the light and directing the light (102, 202A, 202B, 402, 502A, and 502B) comprises various structures. The rotationally symmetric ZNSE aspheric lens 102 consist of rotationally symmetric surfaces. A catadioptric lens is a compound lens in which both a mirror(s) and lenses are used to form an image. The ZNSE aspheric lenses 202A and 202B in the compact imaging spectrometer 200 consist of rotationally symmetric surfaces. The lenses 502A and 502B in the compact imaging spectrometer 500 consist of an aspheric mirror 502A and a ZNSE aspheric lens 502B.

THE GRATING—The grating (103, 203, 403, and 503) comprises a flat reflective grating. The cold stop in the compact imaging spectrometer is at the germanium grating. This ensures that the warm back radiation from outside the spectrometer entrance slit does not reach the detector array. This would cause and unacceptable degradation in the signal to noise ratio. The geometry of the compact imaging spectrometer allows a transmissive cold stop to be used ahead of the grating, for even better thermal background reduction, but this also increases the grating sizes.

THE DETECTOR—The detector (104, 204, 404, and 504) comprises a 2D detector array. The cold stop in the compact imaging spectrometer is at the germanium grating. This ensures that the warm back radiation from outside the spectrometer entrance slit does not reach the detector array.

Small size for an imaging spectrometer is extremely important because it determines the requirements for the cryogenic cooling. For example, if the spectrometer is small it can fly in a small UAV. Also, if the spectrometer is small it is person portable. The imaging spectrometer of the present invention has a front and a back and the entrance slit, the grating, the light means, and the detector fit within an envelope. The imaging spectrometer has a size envelope that is smaller than spectrometers currently in use. As shown in FIG. 1, the entrance slit 101, rotationally symmetric ZNSE aspheric lens 102, germanium grating 103, and 2D detector array 104 fit within the envelope. The envelope is 4.5 cm by 5.6 cm by 2.2 cm or smaller. As shown in FIG. 2, the entrance slit 201, ZNSE aspheric lenses 202A and 202B, germanium grating 203, and 2D detector array 204 fit within the envelope. The envelope is 3.5 cm by 3.3 cm by 2.2 cm or smaller. As shown in FIG. 4, the entrance slit 401, rotationally symmetric ZNSE aspheric lens 402, germanium grating 403, and 2D detector array 404 fit within the envelope. The envelope is 5.5 cm by 5.0 cm by 2.2 cm or smaller. As shown in FIG. 5, the entrance slit 501, lenses 502A and 502B, germanium grating 503, and 2D detector array 504 fit within the envelope. The envelope is 3.5 cm by 3.5 cm by 2.2 cm or smaller. The compact imaging spectrometer 100 meets the requirements in Table 1 below.

TABLE 1

| (Imaging Spectrometer Performance) | |
|---|---|
| Spectral Range | 8–13.5 microns |
| F-number | 5 |
| Detector array | 256 spatial × 256 spectral |
| Pixel size | 40 microns |
| Entrance slit length | 10.24 mm |
| Spatial distortion: change in spatial mapping with wavelength | <0.1 pixel (<±2 microns) |
| Spectral distortion: spectral smile | <0.1 pixel (<t2 microns) |
| Optical performance | Diffraction limited |

The imaging spectrometer provides a compact imaging spectrometer based on catadioptric lenses and a diffraction grating. The compact imaging spectrometer is smaller than those currently in use and has a reduced cryogenic cooling requirement enabling its use in small unmanned aerial vehicles and for man portable instruments. The compact imaging spectrometer can be utilized for remote sensing imaging spectrometers where size and weight are of primary importance. The compact imaging spectrometer has very good spectral and spatial registration providing accurate spectral data for spectral algorithm retrievals. This avoids having to resample the images to correct for these defects, which has the disadvantage of creating spectral mixing between pixels reducing the sensitivity and accuracy of the retrieval algorithms.

The compact imaging spectrometer uses smaller cryogenic coolers facilitating their using in portable (man carried) gas detection systems and in small unmanned aerial vehicles for remote gas detection. The compact imaging spectrometer has application for homeland defense to check for the presence of biological or chemical weapons without entering the contaminated areas. The compact imaging spectrometer also has application for the covert remote sensing of sites not accessible to United States forces. The compact imaging spectrometer 100 can be used for commercial remote sensing where portability is important. The compact imaging spectrometer has use for pollution detection, and remote sensing of agricultural crops, and geological identification. They could also be used for the remote monitoring of industrial processes.

The compact imaging spectrometer is diffraction limited over the wavelength ranges with excellent spatial and spectral resolutions. The spectral slit curvature has been corrected to less than one tenth of a pixel over the detector arrays. This is the curvature of slit image on the detector at a single wavelength, which is a common problem with imaging spectrometer designs. The spatial mapping distortion has also been corrected to less than one tenth off a pixel over the full wavelength range. This means that the spectrum from a single point in the entrance slit will not wander from the center of a row pixels by less than ±2 microns. Correcting the spectral slit curvature and the spatial mapping distortion with wavelength to less than one tenth of a pixel ensures that the images do not have to be resampled to correct for these effects.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An imaging spectrometer apparatus, comprising:
   an entrance slit for directing light,
   a light means for receiving said light and directing said light, said light means comprising a rotationally symmetric ZNSE aspheric lens,
   a grating that receives said light from said light means and defracts said light back onto said light means which focuses said light, and
   a detector that receives said focused light.

2. The imaging spectrometer apparatus of claim 1 wherein said light means is two ZNSE aspheric lenses that are coaxial.

3. The imaging spectrometer apparatus of claim 1 wherein said light means is an aspheric mirror and a ZNSE aspheric lens.

4. The imaging spectrometer apparatus of claim 1 wherein said grating has rulings in a germanium surface.

5. The imaging spectrometer apparatus of claim 1 wherein said grating is a flat germanium grating.

6. The imaging spectrometer apparatus of claim 1 wherein said grating has 45 lines/mm.

7. The imaging spectrometer apparatus of claim 1 wherein said grating has 54 lines/mm.

8. The imaging spectrometer apparatus of claim 1 wherein said grating has 36 lines/mm.

9. The imaging spectrometer apparatus of claim 1 wherein said grating has rulings that are curved.

10. The imagining spectrometer apparatus of claim 1 wherein said grating is tilted.

11. The imaging spectrometer apparatus of claim 1 wherein said apparatus has a front and a back, and wherein said entrance slit, said grating, said light means, and said detector fit within an envelope located between said front and said back.

12. The imaging spectrometer apparatus of claim 11 wherein said envelope is 4.5 cm by 5.6 cm by 2.2 cm or smaller.

13. The imaging spectrometer apparatus of claim 11 wherein said envelope is 3.5 cm by 3.3 cm by 2.2 cm or smaller.

14. The compact imaging spectrometer apparatus of claim 11 wherein said envelope is 5.5 cm by 5.0 cm by 2.2 cm or smaller.

15. The imaging spectrometer apparatus of claim 11 wherein said envelope is 3.5 cm by 3.5 cm by 2.2 cm or smaller.

* * * * *